(12) United States Patent  
Deng

(10) Patent No.: US 7,573,874 B2  
(45) Date of Patent: Aug. 11, 2009

(54) DATA LINK LAYER SWITCH WITH MULTICAST CAPABILITY

(75) Inventor: Shuang Deng, Nashua, NH (US)

(73) Assignee: Verizon Laboratories Inc., Waltham, MA (US)

( * ) Notice: Subject to any disclaimer, the term of this patent is extended or adjusted under 35 U.S.C. 154(b) by 753 days.

(21) Appl. No.: 11/153,823

(22) Filed: Jun. 15, 2005

(65) Prior Publication Data

US 2005/0232272 A1  Oct. 20, 2005

Related U.S. Application Data

(63) Continuation of application No. 09/963,053, filed on Sep. 25, 2001, now Pat. No. 6,937,608, which is a continuation of application No. 09/291,705, filed on Apr. 14, 1999, now Pat. No. 6,317,434.

(51) Int. Cl.  
*H04L 12/28* (2006.01)

(52) U.S. Cl. ........................... 370/390; 370/392

(58) Field of Classification Search .................. None  
See application file for complete search history.

(56) References Cited

U.S. PATENT DOCUMENTS

| | | | | |
|---|---|---|---|---|
| 5,517,494 A * | 5/1996 | Green | ........................... | 370/408 |
| 5,530,703 A * | 6/1996 | Liu et al. | ..................... | 370/255 |
| 5,602,841 A | 2/1997 | Lebizay et al. | ............... | 370/413 |
| 5,617,421 A | 4/1997 | Chin et al. | .................... | 370/402 |
| 5,732,071 A | 3/1998 | Saito et al. | .................... | 370/255 |
| 5,752,003 A | 5/1998 | Hart | ........................... | 709/223 |
| 5,835,723 A * | 11/1998 | Andrews et al. | ............. | 709/226 |
| 5,898,686 A * | 4/1999 | Virgile | ........................ | 370/381 |
| 5,905,859 A | 5/1999 | Holloway et al. | ............ | 713/201 |
| 5,959,989 A | 9/1999 | Gleeson et al. | .............. | 370/390 |
| 6,006,261 A | 12/1999 | Ratcliff et al. | ............... | 709/224 |
| 6,009,467 A | 12/1999 | Ratcliff et al. | ............... | 709/224 |
| 6,052,733 A | 4/2000 | Mahalingam et al. | ........ | 709/235 |
| 6,094,435 A | 7/2000 | Hoffman et al. | .............. | 370/414 |
| 6,104,696 A | 8/2000 | Kadambi et al. | ............. | 370/218 |
| 6,112,323 A | 8/2000 | Meizlik et al. | ............... | 714/748 |
| 6,118,771 A | 9/2000 | Tajika et al. | ................. | 370/328 |
| 6,330,238 B1 * | 12/2001 | Ooe | ............................ | 370/390 |
| 6,430,183 B1 * | 8/2002 | Satran et al. | ................. | 370/389 |
| 6,542,503 B1 * | 4/2003 | Xu et al. | ...................... | 370/390 |

* cited by examiner

*Primary Examiner*—Phirin Sam

(57) ABSTRACT

A data link layer switch includes a switching mechanism coupled to a plurality of port interface controllers. Each of the port interface controllers comprises a multicast address table, a multicast matcher, and a timer. The multicast address table stores multicast addresses for hosts attached to the port interface controller. The multicast matcher matches an incoming packet to a target pattern, generates a multicast address from the incoming packet if the incoming packet matches the target pattern, and stores the generated multicast address in the multicast address table. The timer determines an amount of time that the generated multicast address remains in the multicast address table.

14 Claims, 5 Drawing Sheets

DATA LINK LAYER SWITCH WITH MULTICAST CAPABILITY

RELATED APPLICATION

This is a continuation of prior U.S. patent application Ser. No. 09/963,053, filed Sep. 25, 2001 now U.S. Pat. No. 6,937,608, which is a continuation of U.S. patent application Ser. No. 09/291,705, filed Apr. 14, 1999 now U.S. Pat. No. 6,317,434, which application is related to copending U.S. application Ser. No. 09/291,794, which is assigned to the same assignee and filed on the same date (Apr. 14, 1999) as this application, and incorporated by reference.

FIELD OF THE INVENTION

The present invention relates generally to network switches and more particularly to a data link layer switch that supports Internet Protocol (IP) multicasting.

BACKGROUND OF THE INVENTION

Multicast communication includes the transmission of identical data packets to selected, multiple destinations. In contrast, broadcast communication includes the indiscriminate transmission of data packets to all destinations, and unicast communication includes the transmission of data packets to a single destination.

Every participant in a multicast receives information transmitted by any other participant in the multicast. Users connected to the network who are not participants in a particular multicast do not receive the information transmitted by the participants of the multicast. In this way, the multicast communication uses only the network components (e.g., switches and trunks) actually needed for the multicast transmission.

With conventional techniques, a switch transmits multicast packets on all of its ports. FIG. 1 is a block diagram of an Ethernet switch 100. The Ethernet switch 100 includes a switching mechanism 110 connected to several port interface controllers 120. The switching mechanism 110 may include any conventional shared medium, shared memory, or space-division device.

The port interface controller 120 transports packets between a port and the switching mechanism 110. FIG. 2 is a block diagram of a conventional port interface controller 120. The port interface controller 120 includes an Ethernet interface 210, a Media Access Control (MAC) address learner 220, a MAC address table 230, a MAC address matcher 240, and a controller 250.

The Ethernet interface 210 receives an inbound packet transmitted from a host attached to the switch 100 over an Ethernet channel, and passes the packet to the MAC address learner 220. The MAC address learner 220 reads the Ethernet address of the originating host and stores the address in the MAC address table 230, if the address is not already stored there. The controller 250 maintains addresses of attached hosts in the MAC address table 230. If a host has not transmitted for a certain period of time, the controller 250 removes the MAC address of the host from the MAC address table 230.

The MAC address learner 220 sends the received packet to the controller 250, which, in turn, forwards the packet to the switching mechanism 110 (FIG. 1). The switching mechanism 110 identifies the appropriate port interface controller 120 for the packet and sends it to this controller.

The controller 250 of the identified port interface controller 120 receives the packet and sends it to the MAC address matcher 240. The MAC address matcher 240 compares the packet's destination address to the MAC addresses stored in the MAC address table 230. If the outbound packet's destination address is of a broadcast or multicast type, or is unicast and matches an entry in the MAC address table 230, the MAC address matcher 240 forwards the packet to its port for transmission to the attached host(s).

Conventional Ethernet switches do not support Internet Protocol (IP) multicasting. IP multicasting first found its application in audio and video conferencing. Each IP multicast group has a unique class-D IP address ranging from 224.0.0.1 to 239.255.255.255. Multicast data is sent to a group based on this unique address. For an IP multicast packet transmitted on the Ethernet, the multicast Ethernet address includes the least significant 23 bits of the IP address.

To join a particular IP multicast group, a host sends a "request to join" message to the nearest multicast-capable router to request receiving from the multicast group. The router propagates the request up to the multicast source if the data path is not already in place. Upon receiving an IP packet for this group, the router maps the class-D IP multicast group address into an Ethernet multicast address, and sends the resultant Ethernet group to the Ethernet port from which the original request was received.

The current Internet Group Management Protocol (IGMP) does not specify an explicit message for withdrawing membership from the multicast group. A host's membership expires when the router does not receive a periodic membership report from the host.

Some conventional Ethernet switches route IP packets and, therefore, support IP multicasting. However, despite the words "Ethernet switch" in their names, they are, in fact, not Ethernet switches, but routers because the actual switching is carried out at the IP or the network layer, not at the Ethernet or data link layer. Consequently, their performance and cost are comparable with routers and much higher than that of Ethernet switches due to the overhead of IP decoding and routing.

No multicast mechanism currently exists at the data link layer, corresponding to the IP layer. As a result, a conventional Ethernet switch sends multicast packets to all ports regardless of whether the hosts attached to these ports need them. It is the responsibility of the receiving host to determine whether a packet belongs to the groups that have been requested at the IP layer. The receiving host makes this determination through the use of an address filter either implemented in hardware on a Local Area Network (LAN) controller or in communication control software.

Thus, the current technologies for switching multicast packets at the data link layer are inefficient and will render the network inoperable when several hosts receive different multicast streams concurrently. To illustrate this problem, suppose that a conventional Ethernet switch includes one network port connecting a multicast router at 100 Mb/s and 24 local ports each connecting to a personal computer (PC) at 10 Mb/s. Assume that each of the PCs is tuned to a different video channel via IP multicasting, and each video stream is coded at 1.5 Mb/s. Since the Ethernet switch sends each multicast packet to all ports, the switch incurs a load of 24×1.5=36 Mb/s at each local port, far exceeding the PCs' 10 Mb/s capacity. As a result, the network becomes bogged down by congestion.

Therefore, a need exists to overcome the deficiencies of the conventional data link layer switches.

SUMMARY OF THE INVENTION

Systems and methods consistent with the principles of the present invention address this need by providing true multicasting at an Ethernet switch by sending packets to only those ports having attached hosts that have previously joined the multicast group. In this way, the need for expensive IP decoding and routing is eliminated.

In accordance with the purpose of the invention as embodied and broadly described herein, a system consistent with the present invention includes a switching mechanism coupled to a plurality of port interface controllers. Each of the port interface controllers comprises a multicast address table, a multicast matcher, and a timer. The multicast address table stores multicast addresses for hosts attached to the port interface controller. The multicast matcher matches an incoming packet to a target pattern, generates a multicast address from the incoming packet if the incoming packet matches the target pattern, and stores the generated multicast address in the multicast address table. The timer determines an amount of time that the generated multicast address remains in the multicast address table.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention support true multicasting in a data link layer switch, such as an Ethernet switch, by transmitting packets on only those ports with hosts that have previously joined the multicast group. This Ethernet switch multicasting reduces network traffic load and allows the Ethernet switch to be used for a large number of multicast streams. In particular, this switch can be used to provide near video-on-demand and broadcast video services.

Figure 1:
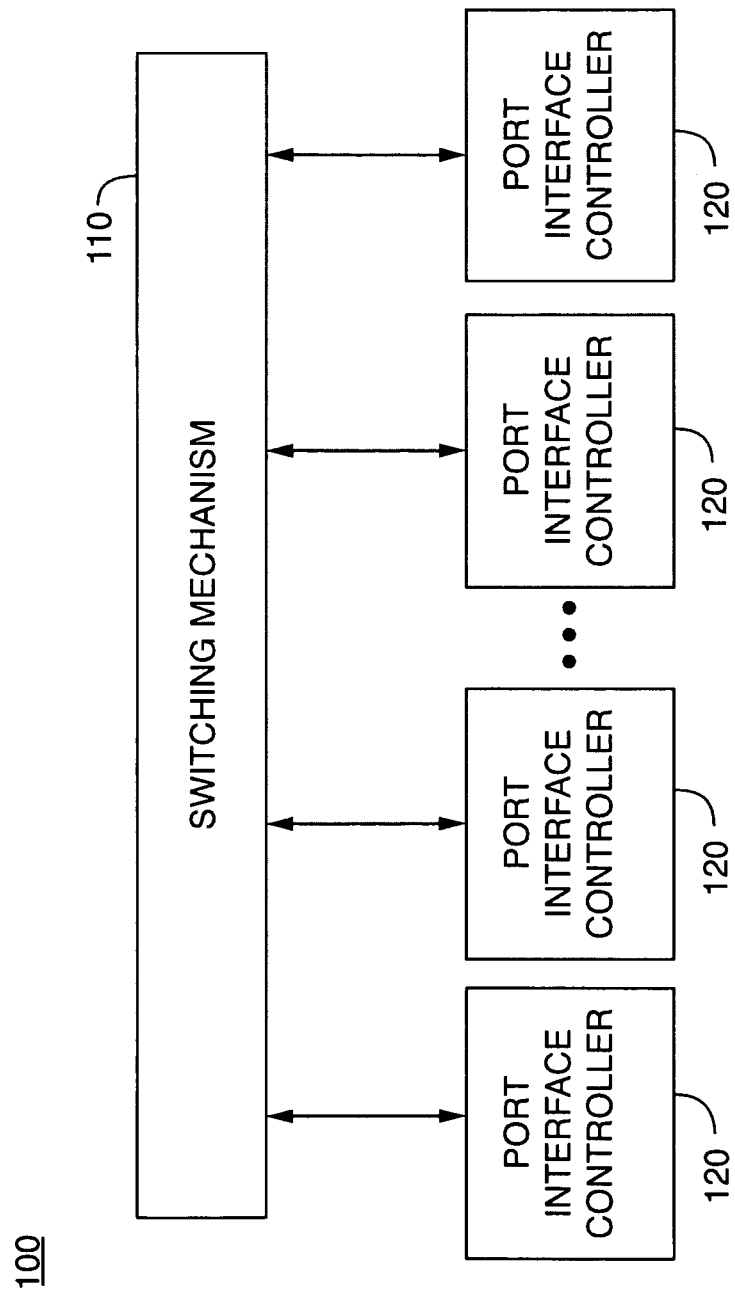
FIG. 1 is a block diagram of an Ethernet switch.
Figure 2:
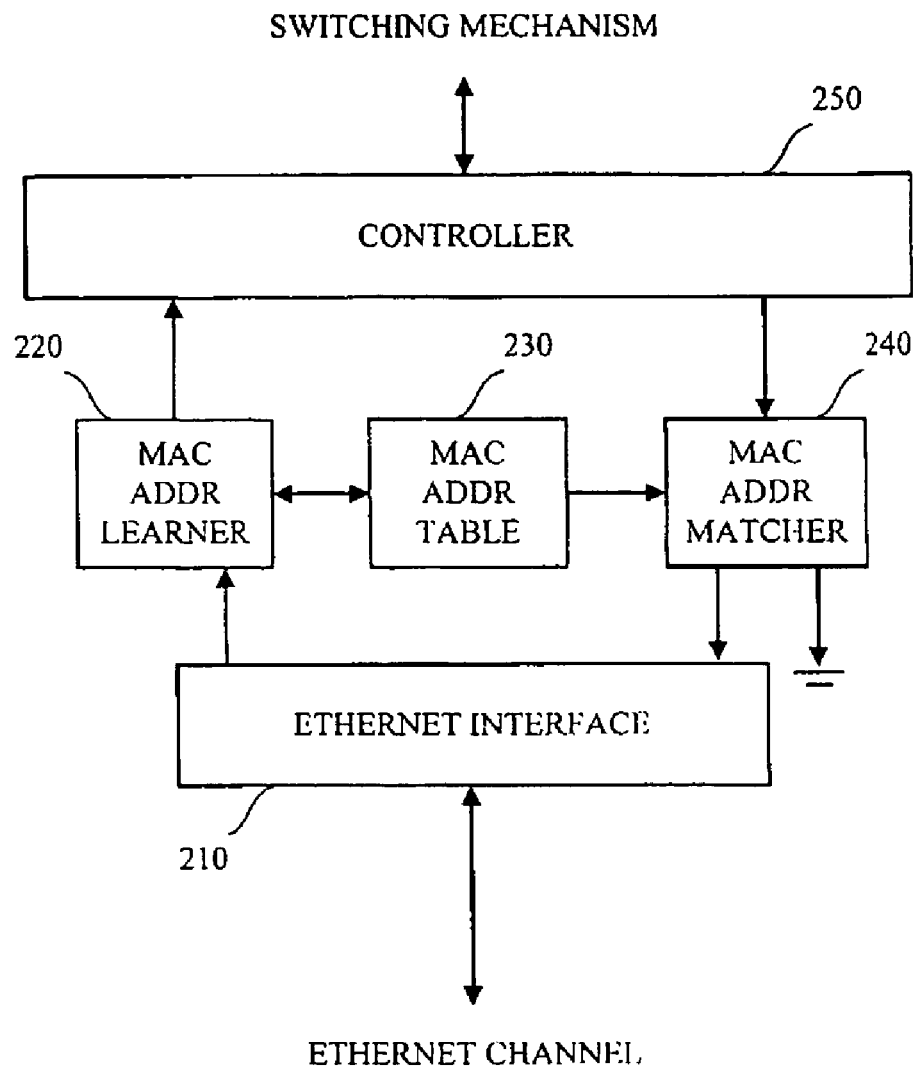
FIG. 2 is a block diagram of a port interface controller in the switch of FIG. 1.

Referring to FIG. 1, an Ethernet switch consistent with the present invention contains a standard configuration. That is, the Ethernet switch includes a switching mechanism 110 coupled to several port interface controllers 120. The elements comprising the port interface controllers 120 differ, however, from those elements shown in FIG. 2.

Figure 3:
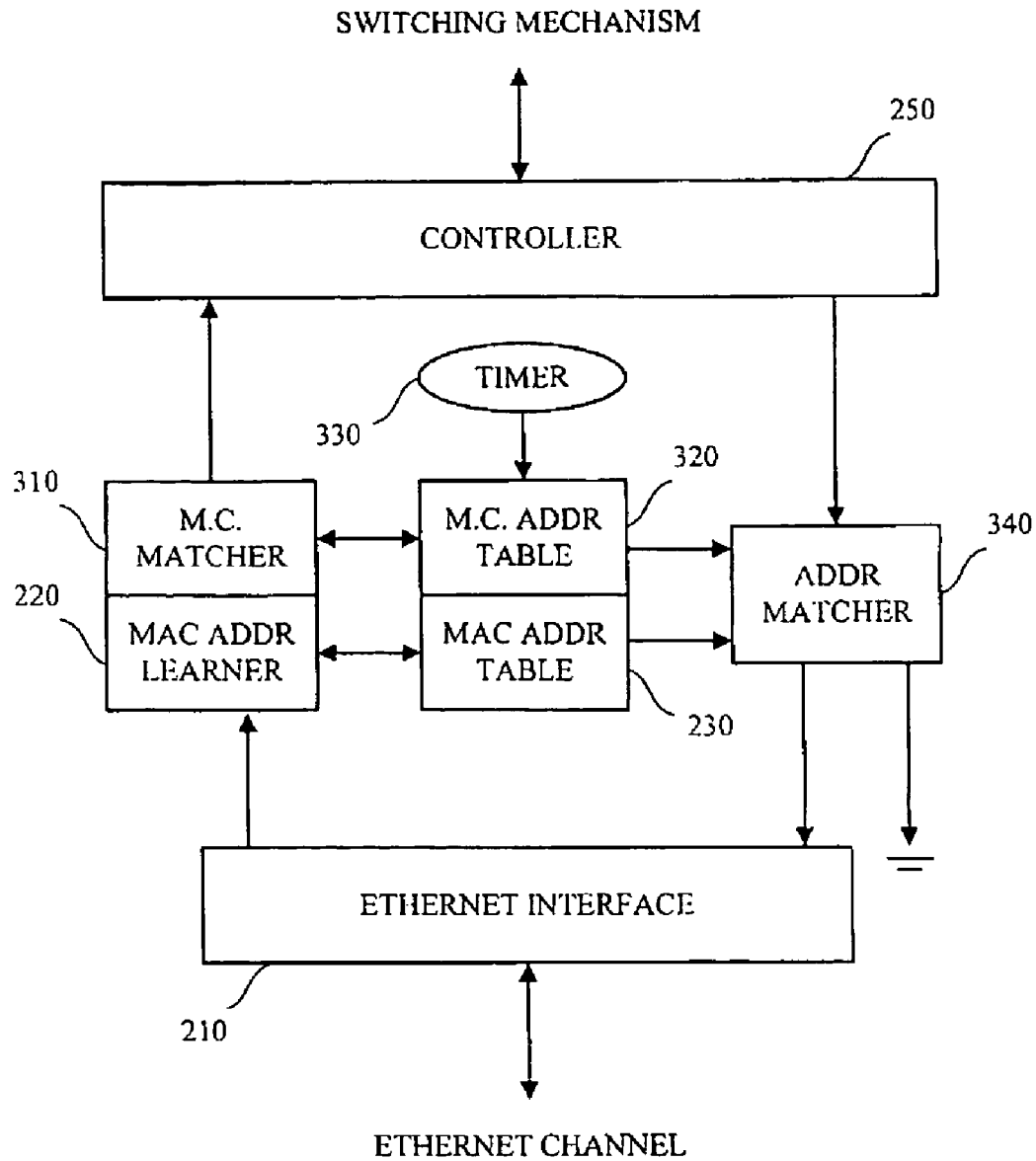
FIG. 3 is an Ethernet switch consistent with the present invention.

FIG. 3 is a diagram of a port interface controller 300 consistent with the present invention. The port interface controller 300 includes some of the same elements included in the conventional port interface controller 120 shown in FIG. 2. These elements contain the same reference numerals.

The port interface controller 300 includes an Ethernet interface 210, a MAC address learner 220, a MAC address table 230, a controller 250, a multicast request matcher 310, a multicast Ethernet address table 320, a timer 330, and an address matcher 340.

The multicast request matcher 310 includes a standard bit-pattern matcher of fixed length whose target pattern is updatable through a software download to support a variety of protocols and different versions. For the current version of IP and Ethernet protocols, the target pattern operates on the 13th, 25th, and 35th bytes of the Ethernet packet (i.e., the protocol-type field of the Ethernet and IP headers, and the version and type fields of the IGMP header). The matcher 310 finds a match, for example, if the protocol fields are IP and IGMP, and the byte for version and type is 0x21.

The multicast address table 320 contains a list of Ethernet multicast addresses of hosts attached to the Ethernet channel. The table is similar in construction and format to the MAC address table 230. The timer 330 is a counting mechanism implemented in hardware, using a conventional counter, or software, using a conventional counting algorithm. The address matcher 340 includes a mechanism for comparing a destination address to the addresses stored in the MAC address table 230 and the multicast address table 320.

Figure 4:
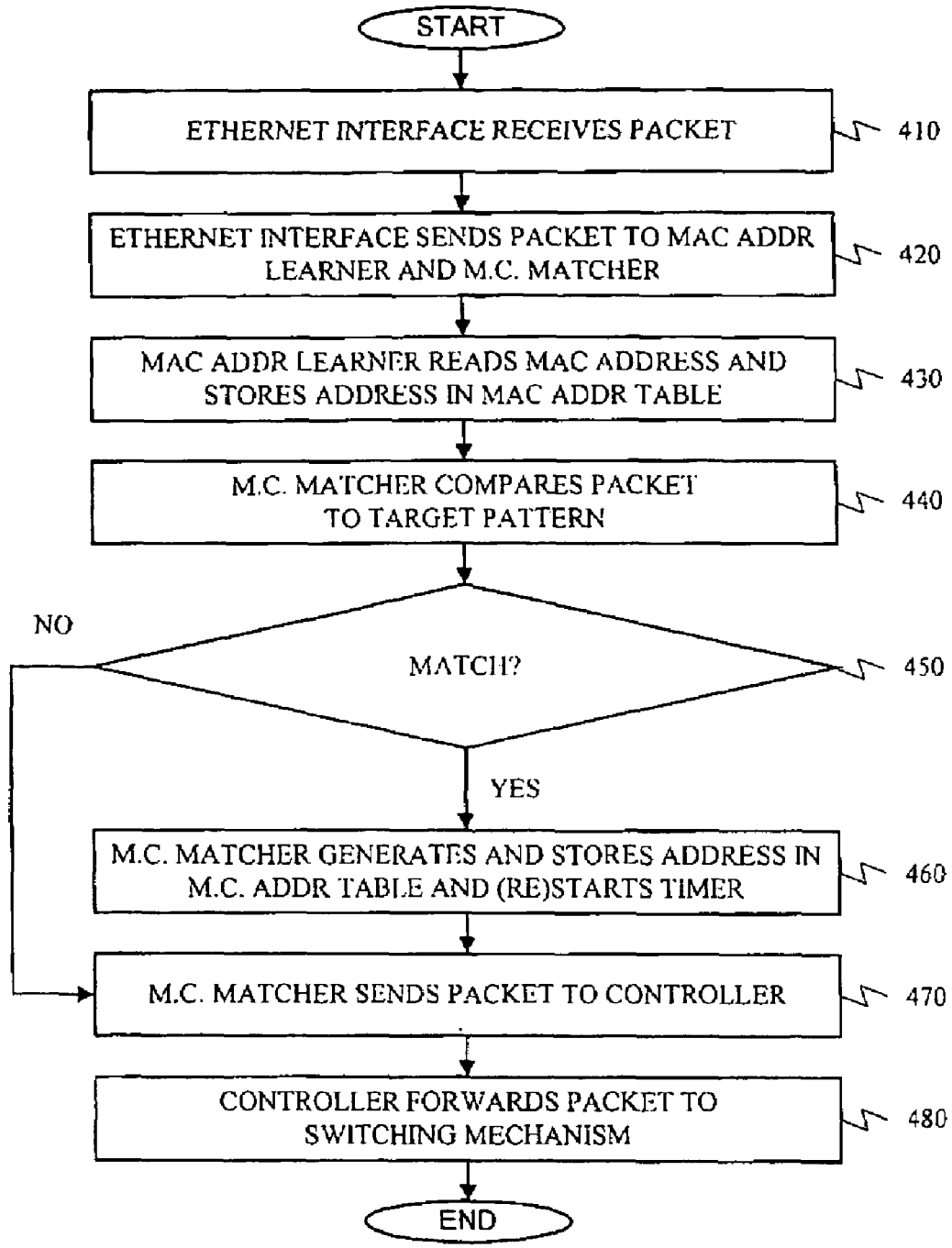
FIG. 4 is a flowchart of multicast processing of an incoming packet performed by the port interface controller 300 of FIG. 3.

FIG. 4 is a flowchart of multicast processing of an incoming packet performed by the port interface controller 300 of FIG. 3. The Ethernet interface 210 receives an incoming packet from a host attached to an Ethernet channel [step 410]. The interface 210 sends the packet to the MAC address learner 220 and the multicast request matcher 310 [step 420].

The MAC address learner 220 reads the Ethernet address of the originating host and stores the address in the MAC address table 230, if the address is not already stored there [step 430]. The controller 250 maintains addresses of attached hosts in the MAC address table 230. If a host has not transmitted for a certain period of time, the controller 250 removes the MAC address of the host from the MAC address table 230.

The multi cast request matcher 310 determines whether the packet matches a target pattern [step 440]. For example, the matcher 310 may compare the packet to a target pattern that operates on the 13th, 25th, and 35th bytes of the packet. If the packet matches the target pattern [step 450], the matcher 310 performs no decoding, but simply extracts the 37th through 39th bytes of the packet and sets the highest bit to zero. The matcher 310 then appends these bytes to an Ethernet multicast address header, such as the Ethernet multicast header 0x01005e000, and stores the newly formed Ethernet multicast address in the multicast address table 320 [step 460]. The Ethernet multicast address is derived according to an IP to Ethernet address mapping method defined in IETF RFC-1112, which is hereby incorporated by reference.

The multicast matcher 310 stores the multicast address in the multicast address table 320 only if the packet is a request to join a multicast group. If the packet is, instead, a request to leave a multicast group, the multicast matcher 310 removes the multicast address from the multicast address table 320.

In addition to storing the multicast address, the matcher 310 starts or restarts the timer 330. The timer 310 is used to determine the length of time that an address remains in the multicast address table 320. An address is removed from the table upon the expiration of the timer.

If the packet does not match the target pattern [step 450] or does match and the multicast address has already been stored in the multicast address table 320 [step 460], the multicast address matcher 310 sends the packet to the controller 250 [step 470]. The controller 250 forwards the packet to the switching mechanism [step 480], ending the processing of the incoming packet by the port interface controller 300.

Figure 5:
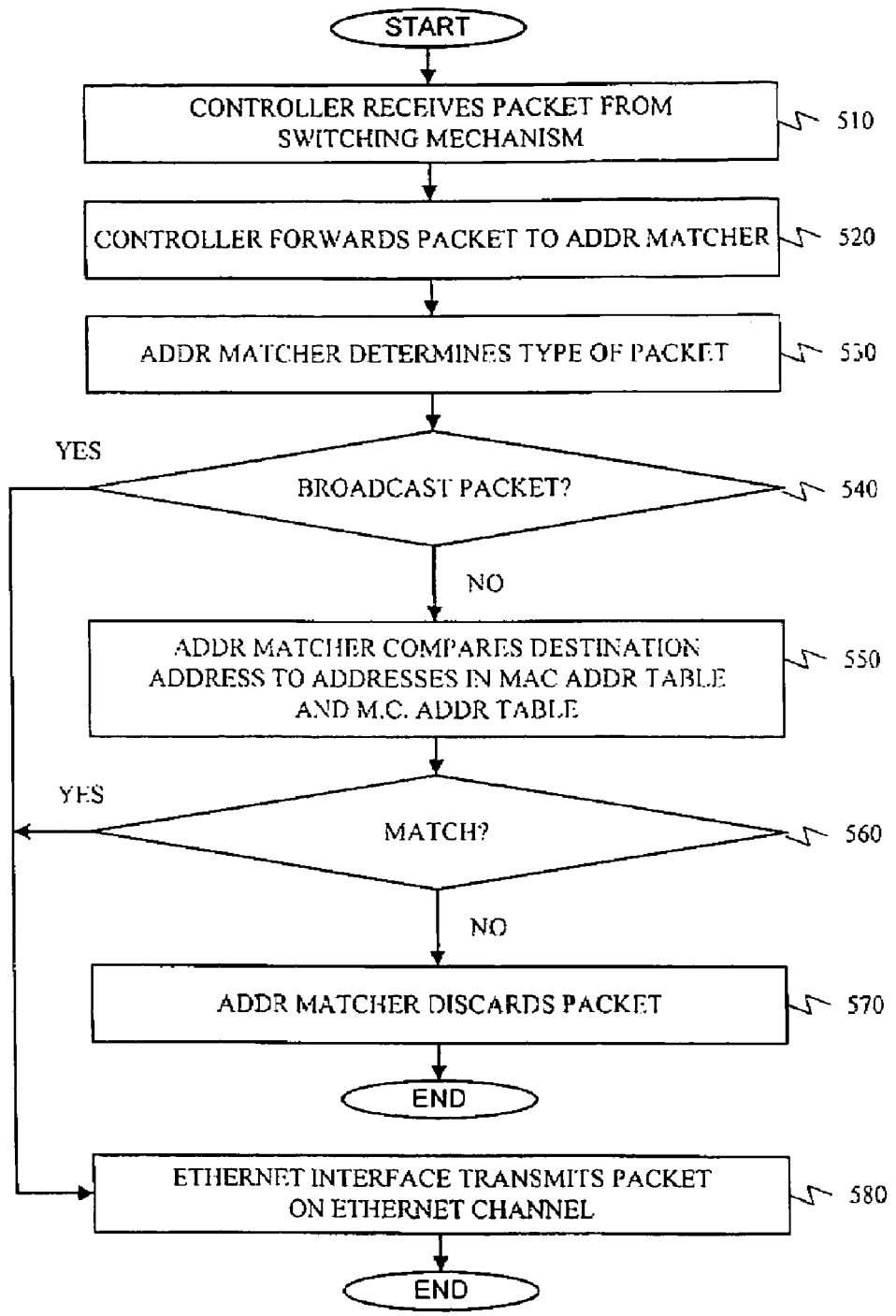
FIG. 5 is a flowchart of multicast processing of an outgoing packet performed by the port interface controller 300 of FIG. 3.

FIG. 5 is a flowchart of multicast processing of an outgoing packet performed by the port interface controller 300 of FIG. 3. The controller 250 receives an outgoing packet from the switching mechanism [step 510]. The controller 250 forwards the packet to the address matcher 340 [step 520].

The address matcher 340 determines whether the packet is of a unicast, multicast, or broadcast type [step 530]. If the packet is not a broadcast packet [step 540], the address matcher 340 compares the destination address to the addresses stored in the MAC address table 230 and the multicast address table 320 [step 550]. If the destination does not match an address in either of the tables [step 560], the address matcher 340 discards the packet [step 570].

If the packet is a broadcast packet [step 540] or is a unicast or multicast packet and the destination address matches an address in either the MAC address table 230 or the multicast address table 320 [step 560], the address matcher 340 transmits the packet on the Ethernet channel via the Ethernet interface 210 [step 580]. The transmission ends the processing of the outgoing packet by the port interface controller 300.

The systems and methods consistent with the present invention support multicasting in a data link layer switch by sending packets to only those ports having an attached host that has joined the multicast group.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the foregoing description was directed toward multicasting in an Ethernet switch. However, the present invention is not limited to an Ethernet switch. The foregoing description applies equally well to other data link layer switching mechanisms.

What is claimed is:

1. A system comprising:
    a receiver that receives a data packet having a data link layer host address;
    a first address table that stores multicast addresses;
    a multicast matcher that determines a multicast address from the data packet if the data packet matches a target pattern associated with multicast packets, and stores the determined multicast address in the first address table when at least a portion of the data packet matches the target pattern;
    a timing facility that indicates a time at which the determined multicast address is to be removed from the first address table; and
    a data link layer address learner that determines the data link layer host address and stores the data link layer host address in a second address table, wherein the first address table and the second address table are separate tables.

2. The system of claim 1, wherein the timing facility includes a counting mechanism.

3. The system of claim 1, further comprising:
    a switching mechanism that forwards the data packet to a destination of the data packet.

4. The system of claim 1, wherein the data packet is an Ethernet packet.

5. The system of claim 1, wherein the target pattern is a bit pattern that indicates a multicast packet.

6. The system of claim 1, wherein the multicast matcher is further configured to determine if the data packet is a request to join a multicast group.

7. A system comprising:
    a receiver that is configured to receive a data packet having a data link layer host address;
    a switching mechanism that is configured to forward the data packet;
    a multicast address table that stores multicast addresses;
    a multicast matcher coupled to the receiver, the switching mechanism and the multicast address table, the multicast matcher configured to receive the data packet from the receiver, determine a multicast address from the data packet if the data packet matches a target pattern associated with multicast packets, store the determined multicast address in the multicast address table when the data packet matches at least a portion of the target pattern, and forward the data packet to the switching mechanism for delivery to a destination of the data packet; and,
    a data link layer address learner that determines the data link layer host address and stores the data link layer host address in another address table separate from the multicast address table.

8. The system of claim 7, wherein the multicast matcher is coupled to the switching mechanism via a controller.

9. The system of claim 7, wherein the data packet is an Ethernet packet.

10. The system of claim 7, further comprising:
    a timing facility that indicates a time at which the determined multicast address is to be removed from the multicast address table.

11. A method comprising:
    receiving a data packet having a data link layer host address;
    comparing the data packet to a target pattern;
    determining a multicast address from the data packet when at least a portion of the data packet matches the target pattern;
    storing the determined multicast address in a data link layer address table;
    forwarding the data packet towards a destination of the data packet; and
    determining the data link layer host address by operation of a data link layer address learner and storing the data link layer host address in another address table separate from the data link layer address table.

12. The method of claim 11, further comprising:
    determining that the data packet includes a request to join a multicast group.

13. The method of claim 11, further comprising:
    setting a timer that indicates a time at which the determined multicast address is to be removed from the data link layer address table.

14. The method of claim 11, wherein the data packet is an Ethernet packet.

* * * * *